UNITED STATES PATENT OFFICE.

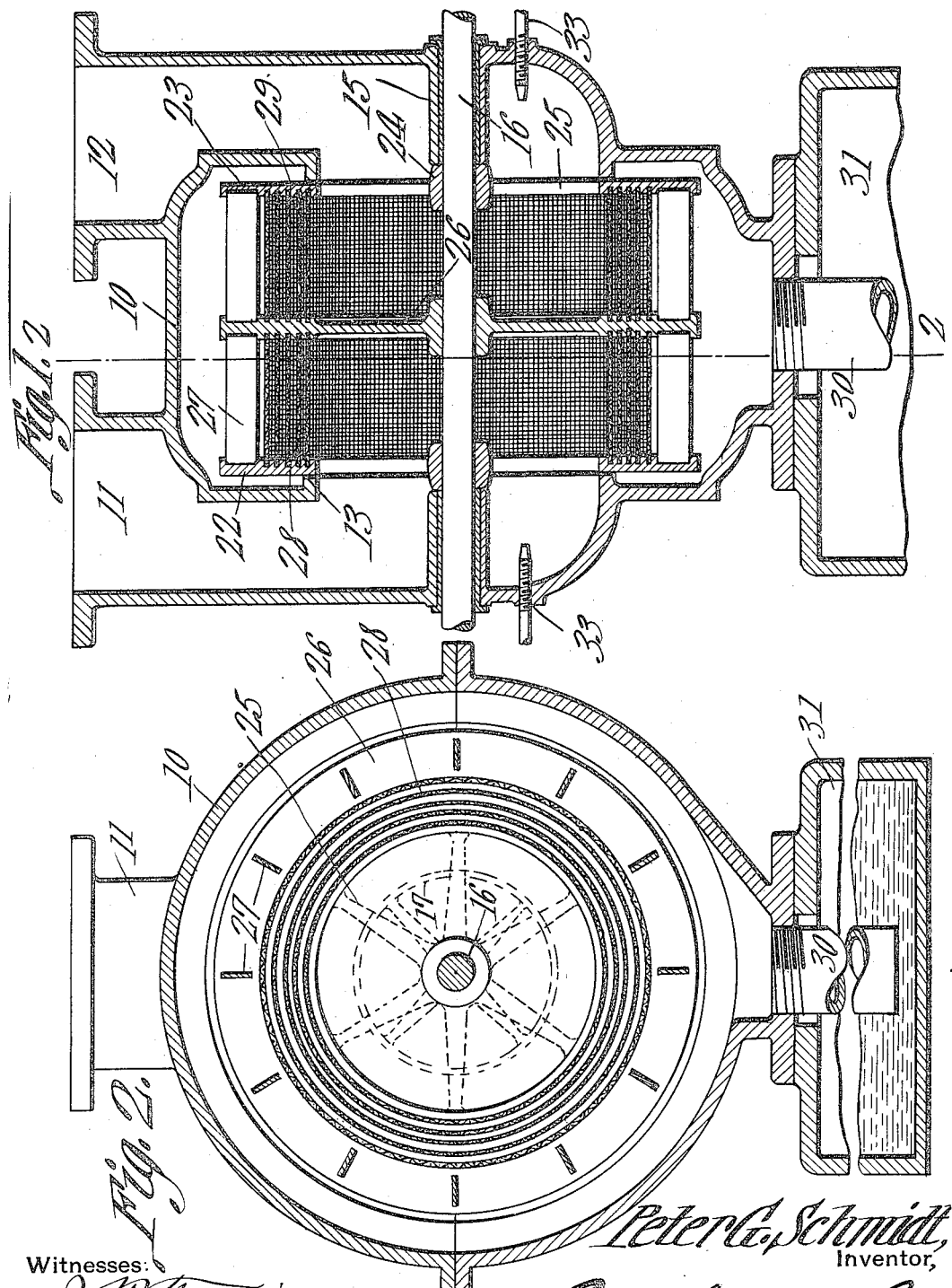

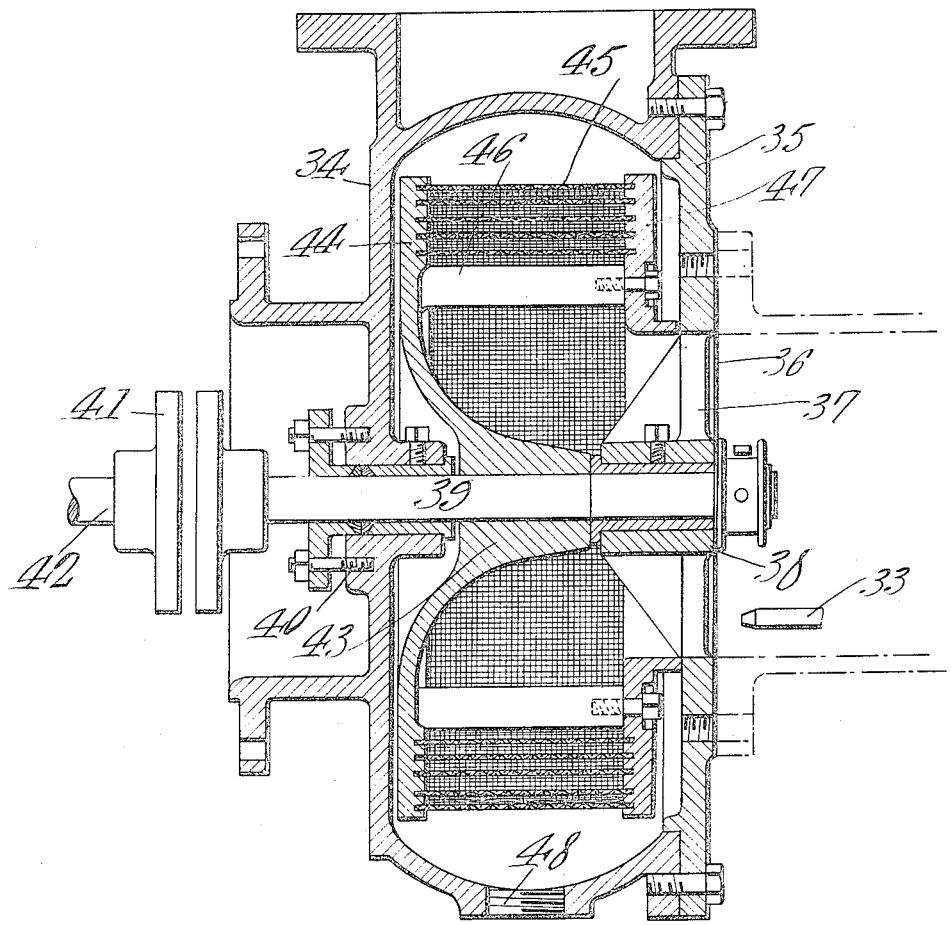

PETER G. SCHMIDT, OF OLYMPIA, WASHINGTON.

GAS-WASHER.

1,051,017.	Specification of Letters Patent.	Patented Jan. 21, 1913.

Application filed February 25, 1911. Serial No. 610,768.

*To all whom it may concern:*

Be it known that I, PETER G. SCHMIDT, a citizen of the United States, residing at Olympia, in the county of Thurston and State of Washington, have invented a new and useful Gas-Washer, (Case B,) of which the following is a specification.

This invention relates to gas washing or cleaning apparatus, and has for its principal object to provide a device of very simple construction for washing, cleaning and purifying any gas, which term is intended to include air, and removing therefrom any dust, tar, vapors, volatile matters, or any other entrained foreign substance of a mechanical nature, or any impurity of a chemical or mechanical nature, the apparatus being so constructed as thoroughly to break up or divide the gas in the presence of a finely divided liquid spray, preferably water, the resultant compound of water and impurities being a mixture or emulsion of particular intimacy.

A further object of the invention is to provide an apparatus in which the gas will be subjected to the action of centrifugal force so that the heavy moisture and more or less viscous tarry matter will be deposited by impact, these impurities being thrown by centrifugal force with considerable violence against the casing and cling thereto while the more mobile gas may change its direction of movement and seek the gas outlet of the apparatus.

A still further object of the invention is to provide a separator and purifier of the centrifugal type separated into compartments, in which the flow of gas is from an interior inlet or entrance compartment outward, being thus accelerated by the centrifugal force developed, and then passes to an interior discharge compartment, so that the gas is thus compelled, on moving into the second compartment, to travel in a direction opposite to the centrifugal force and its flow therefore is retarded to such an extent that between the two compartments the tension or pressure will be materially increased and there will be a tendency mechanically to squeeze out or precipitate heavy or moist impurities.

A still further object of the invention is to provide a separator or gas washer of this type, in which the gas is compelled to pass by centrifugal force and under pressure through a number of screens by which it is thoroughly broken up and highly sub-divided, so as to facilitate the mechanical deposit of foreign matter and then, in one form of the invention, to subject the gas to a second screening or straining action while traveling counter to the centrifugal force and when its flow is retarded.

With these and other objects in view, as will more fully hereinafter appear, the invention consists in certain novel features of construction and arrangement of parts, hereinafter fully described, illustrated in the accompanying drawings, and particularly pointed out in the appended claim, it being understood that various changes in the form, proportions, size and minor details of the structure may be made without departing from the spirit or sacrificing any of the advantages of the invention.

In the accompanying drawings:—Figure 1 is a sectional elevation of a gas washing and purifying apparatus constructed in accordance with the invention. Fig. 2 is a transverse section on the line 2—2 of Fig. 1. Fig. 3 is a sectional elevation of a gas washing and purifying apparatus through which the gas flows only in the same direction as the centrifugal action.

The gas washer, as shown in Figs. 1 and 2 has a main casing 10 of general cylindrical form and preferably made in two sections connected by bolting flanges shown in Fig. 2. At the upper portion of the casing are ports 11 and 12 that extend down to the central portion of the opposite ends of the casing and these ports are provided with cylindrical flanges 13 that extend inward within the casing for a short distance in order properly to guide the course of the gas, the gas entering through the port 11 and being discharged through the port 12, or vice versa.

The opposite side walls of the casing are provided with bushings 15 forming bearings for a shaft 16 which is provided at one end with any suitable means of rotation, such as a belt pulley 17. The shaft carries a rotary beater or agitating drum comprising end rings 22 and 23 supported each by a central hub 24 and arms 25, and at the center of the drum is a partition disk or web 26 rigidly secured to the shaft and dividing the drum into two compartments. One of these compartments communicates with the inlet port 11 and the other with the discharge port 12, and it may be here noted that the internal diameter of the rings 22 and 23 is equal to the internal diameter of the mating flanges 13, so that the gas may flow freely into and from the eyes of the drum.

Near the peripheries of the rings 22, 23 and in the central web or disk are formed matching recesses for the reception of the ends of vanes or blades 27 arranged in circular series and which act as beaters or agitators and also serve to carry around the gas with them, so as to develop centrifugal action. Similar blades may also be arranged near the central portion of the inlet compartment so as immediately to engage with the entering volume of gas and tend to force the same outward to the periphery of the drum at the entrance side thereof.

The adjacent faces of the ring and drum are provided with a plurality of annular matching grooves for the reception of a series of concentric screens, there being one set of screens 28 in the inlet compartment and a similar set of screens 29 in the discharge compartment and the gas passes through these screens in the order named.

The diameter of the drum is sufficiently less than the internal diameter of the casing that an annular space is formed in which the gas and impurities may accumulate, while the impurities reaching and adhering to the inner wall of the casing may flow down the same and be directed through one or more discharge pipes 30 into a collecting tank 31, these impurities being drawn off at any time or continuously, as circumstances may require, or the impurities so escaping from the casing may be directed elsewhere.

At the opposite ends of the casing are arranged liquid inlet spray pipes 33, these being disposed in axial alinement or otherwise in such position as to direct one or more jets of liquid into the interior of the drum and preferably against the opposite sides of the disk or web 26, the impact of the jets against the disk serving to form a more or less finely divided spray which by contact with the gas will reduce the temperature thereof and at the same time act to remove impurities.

The structure shown in Fig. 3 is generally similar in principle to that shown in Fig. 1, except that but a single chamber is formed in the rotor and the gas entering the center thereof passes outward through the rotating series of screens and then directly from the depositing chamber for separated impurities to the point of utilization or storage, instead of then passing against the action of centrifugal force to the gas outlet of the apparatus.

The structure of Fig. 3 comprises a casing 34 having one side 35 removable and this side or face is formed with a central eye 36 traversed by spokes or radial arms 37 supporting a bearing 38 for one end of a shaft 39. The other end of the shaft extends through a bearing 40 in the opposite wall or face of the casing and may carry one member of a friction clutch 41, the other member of which is carried by a drive shaft 42.

Mounted on the shaft 39 is a rotor comprising a hub 43 from which there extends in a generally radial direction a web or disk 44 having on its inner face near the periphery a series of concentric grooves each receiving one edge of a corresponding one of a concentric series of cylindrical screens 45.

Interior to the screens the hub 44 is formed with elongated spacing studs 46 having secured to their free ends an annular plate 47 grooved to receive and hold the other edges of the screens 45. The annulus 47 has its interior diameter the same as that of the eye 36 of the side 35 of the casing.

In the structure shown in Fig. 3 the gas enters through the eye 36 and passes out through the screens 45 to the space between the outer screen and the inner wall of the casing and from said space directly to an outlet port. The separated impurities and the washing water pass from the casing by way of an opening 48 into which a pipe similar to the pipe 30 of Figs. 1 and 2 may be screwed. It will be understood, of course, that washing water is introduced into the rotor of Fig. 3 by one or more spray pipes like the pipes 33 of Figs. 1 and 2.

It will be observed that in the operation of the washer or purifier forming the subject of the present invention, a number of principles involving various classes of cleaning, scrubbing and purifying apparatus are combined in a single structure, and in operation various impurities in dry, liquid, semi-liquid and vaporous forms are separated from the gas, these impurities passing downward through the discharge pipes into the lower collecting tank or to any other suitable place.

The dry impurities generally include dust, lamp black, metallic and ash particles. The liquid impurities include moisture and various compounds; the semi-liquid impurities include oils, tars, tarry matters and various viscous hydro-carbons, and the vaporous impurities are in the form of aqueous vapor, viscous vapor or fogs and inert or uncombined gases such as carbon dioxid.

The gas entering the washer is cooled by the spray of water or other washing liquid and this effects a change of vapor tension, and, also, a change of volume, the reduction in temperature naturally causing condensation and a deposit of any heavy matter which may be held in suspension. The change in volume is in part due to the change in temperature and further to the mechanical action of the revolving beater or agitating drum, and results, also, in differences in pressure at different points within the casing, the greatest pressure being as before described at a point which is outside the periphery of the drum or rotor, especially in the structure shown in Figs. 1 and 2. This change in pressure with its consequent change in volume tends to press out and cause the precipitation of excess moisture.

One of the principal effects from the application of centrifugal force to the gas is that the heavy moisture and more or less viscous tarry matter will be deposited by impact, that is to say, these impurities will be thrown against the casing with some violence and will cling thereto while the mobile gas will sweep around the casing and pass to the outlet port in the structure shown in Fig. 3, or, in the structure shown in Figs. 1 and 2, inward through the discharge compartment to the outlet. Inasmuch as, in the structure shown in Figs. 1 and 2, the centrifugal action will tend to retard the inflow of gas to the discharge compartment while the same force acts to accelerate the flow of gas from the inlet compartment, there will be a marked increase of pressure in the space between the periphery of the drum and the wall of the casing. There is also a wire drawing action on the gas to be considered. All of the gas must pass through the reticulated screen and thus be mechanically screened and filtered, and in passing into the central portion of the discharge compartment these fine streams of gas will be subjected to the action of the washing spray.

The rotor of the washer travels at high speed and the washing water is caught by the screens and is violently whirled around, and thrown by centrifugal force from screen to screen, being subjected to the impact of the strands forming the screens, and finally to the impact of the blades 27, so that the water is reduced to a highly divided state, being in the form of a very fine mist or cloud. The effect of the rapidly revolving screens upon the gas is to give it a whirling motion, and cause it to flow by centrifugal force through the screens and toward the inner wall of the casing in fine streams which intermingle with the watery mist or cloud. The water thus reduced to microscopic particles presents a great absorption surface to the gas so thoroughly mixed therewith and the gas is thus cleansed of impurities, this being due to the very intimate and violently agitated mixture of the gas and watery particles.

The watery mist and absorbed impurities are driven by centrifugal force to the inner wall of the casing where the watery particles coalesce into drops and streams and flow by gravity to the point of escape.

The cleansing of the gas takes place wholly or in the main as the gas is passing from the central inlet to the chamber surrounding the rotor, and, therefore, a markedly clean gas results from the action of the structure of Fig. 3. In the structure of Figs. 1 and 2, the gas, in order to escape through the outer port, must pass again to the interior of the rotor, but on the other side of the web or disk 26 dividing the rotor intermediately.

In order to reach the interior of the rotor from the outside thereof the gas must traverse the rapidly moving screens against the action of the centrifugal force developed and must also be subjected to the action of an outwardly moving highly attenuated watery mist like that on the inlet side of the rotor.

The retardation of the flow of the gas toward the exit side of the rotor results in the establishing of a gas pressure in the chamber about the rotor, thus still further facilitating the deposition of any impurities in the gas.

The second outwardly moving watery mist through which the already cleansed gas passes to reach the exit from the washer, causes the removal from the gas of impurities which may be still carried thereby, and the escaping gas is practically free from deleterious impurities, as tests have demonstrated. Causing the gas to traverse the screens against the action of centrifugal force also tends to dry the gas even though the watery spray and mist must also be traversed.

Owing to the peculiar intimacy and intermixture of the various elements of which the gas is composed and which it carries into the washer, there has been in most cases considerable difficulty experienced in the production of pure gas, but by subjecting the gas to the various actions and forces herein described, it is broken up and washed and purified in such manner as to separate not only the mechanical impurities and excess moisture, but, also, chemical impurities, such as ammonia, carbon dioxid, sulfur, and other compounds which may be detrimental or injurious to the gas.

Having thus described the invention, what is claimed is:

In a gas treating apparatus, a suitable casing, an inlet in one end thereof and an outlet in the opposite end thereof, a rotor mounted in said casing and comprising a central partition, a plurality of concentrically arranged screens on each side of said partition, and a plurality of radially extending blades on the outside of each set of screens, substantially as described.

In testimony that I claim the foregoing as my own, I have hereto affixed my signature in the presence of two witnesses.

PETER G. SCHMIDT.

Witnesses:
  JOSEY RBJOUKERT,
  A. J. COLBY.